United States Patent [19]

Rocher et al.

[11] 3,732,374

[45] May 8, 1973

[54] COMMUNICATION SYSTEM AND METHOD

[75] Inventors: Edouard Y. Rocher, Ossining; Stanley E. Schuster, Granite Springs, both of N.Y.

[73] Assignee: International Business Machines Corporation, Armonk, N.Y.

[22] Filed: Dec. 31, 1970

[21] Appl. No.: 103,243

[52] U.S. Cl. ........................................179/15 AL
[51] Int. Cl. ........................................H04j 3/08
[58] Field of Search ........................................179/15 AL

[56] References Cited

UNITED STATES PATENTS

| | | | |
|---|---|---|---|
| 3,544,976 | 12/1970 | Collins | 179/15 AL |
| 3,458,661 | 7/1969 | Forde | 179/15 AL |
| 3,632,881 | 1/1972 | Graham | 179/15 AL |
| 3,643,030 | 2/1972 | Sparrendahl | 179/15 AL |

*Primary Examiner*—Ralph D. Blakeslee
*Attorney*—Hanifin and Jancin and T. J. Kilgannon, Jr.

[57] ABSTRACT

A multi-loop multiplex communication system is disclosed wherein a plurality of remote transmitting terminals are connected via a loop to a system controller and wherein a plurality of remote receivers are connected via a second loop to the same system controller. In operation, all communications between devices associated with the first loop, the second loop and the system controller are carried out via assigned time slots in a system time frame. Under control of the system controller, all communications between devices associated with the first loop and devices associated with the second loop are carried out via non-assigned time slots in the system time frame. When device-to-device communications are being carried out, means are provided at the system controller for connecting the first and second loop in series converting the two loops from their essentially parallel operation when devices associated with either loop interact with the system controller. In one embodiment, a variable time delay is provided at the system controller called a compensation delay which, regardless of the loop lengths, in conjunction with the propagation delay, makes the total delay a constant value. This permits the use of the same assigned time slot by the transmitter and receiver associated with a given device and which are connected to different loops. In another embodiment, the delay arrangement is eliminated by providing a third cable which is in parallel with both loops and which provides a bit, byte and frame synchronization for all devices associated with both loops. In the latter arrangement, however, device-to-device communication is still carried out using nonassigned time slots while device-to-system controller and system controller-to-device communications are still carried out on assigned time slots. A controller switching arrangement is shown along with an example of a typical terminal device and, further, a method for operating the multi-loop multiplex communication system is disclosed.

30 Claims, 7 Drawing Figures

INVENTORS
EDOUARD Y. ROCHER
STANLEY E. SCHUSTER

BY Thomas J. Kilgannon Jr.

ATTORNEY

MESSAGE SWITCHING

COMMUNICATION SYSTEM AND METHOD

BACKGROUND OF THE INVENTION

1. Field of the Invention

This invention generally relates to multiplex systems and their method of operation which incorporate cable loops which emanate from and return to a system controller for transmitting data to the system controller and for switching between devices associated with the loops. More specifically it relates to a multi-loop, multiplex system in which devices which are basically transmitters are associated with one loop and in which devices which are basically receivers are associated with a second loop. These devices or terminals are connected in parallel with their respective loops and each device is capable of communicating with a system controller and with other devices or terminals on the loops. In a preferred embodiment, all communications between devices or terminals and the system controller are carried out in assigned time slots in the system time frame while all device-to-device or terminal-to-terminal communications are carried out via nonassigned time slots in the system time frame under control of the system controller. Switching means are provided at the system controller for serially connecting the loops of the system when device-to-device communication is required. The connecting of the system loops in series makes switching between devices on the loops possible without the use of store and forward techniques. The use of time division multiplexing using assigned slots and the availability of nonassigned slots eliminates the conventional requirement of connecting shift registers in series with the loops at each loop interface. Because of this, switching delay is minimum (i.e., it is equal to the propagation time). This property is most significant when interconnecting data processing units. The second advantage of the addressing scheme is that high reliability results because the devices are connected in parallel with the loop and high impedence connections to the loop are possible. The system can be utilized with low and high speed devices and the concepts involved can be extended to voice switching.

2. Description of the Prior Art

The multiplexing of messages from a system controller to a plurality of remote terminals and vice versa is well known. The use of multi-drop systems is a specific example. The use of a loop to interconnect a plurality of remote devices or terminals is also well known. In such systems, a receiver-transmitter is generally located at each terminal and receivers receive and transmitters transmit in accordance with a pre-ordained order or in accordance with a pre-ordained priority system. These systems are generally connected in series and when one terminal wishes to transmit, all terminals on a loop are inactivated to permit communication of the remote station with the system controller. These systems are characterized by the fact that all traffic whether in-going or out-going must be handled by the system controller. Switching of information between devices nearly always includes the system controller and there is little, if any, direct communication between devices or terminals without the intervention of the system controller. Using the apparatus and method of the present application, store and forward techniques are substantially eliminated and substantially standard interfaces are provided for all devices or terminals. Each device or terminal, independent of bit rates and control functions, is capable of communicating with a system controller attached to a large central processing unit via the standard interface in an efficient manner. Also, the system as implemented herein is compatible with high speed channel operations as well as low speed channels.

SUMMARY OF THE INVENTION

The apparatus of the present invention, in its broadest aspect relates to a multiplex communication system which includes a system controller which has means disposed therein for generating system time frames. It includes first and second communication loops; a plurality of tranceivers connected to the first loop; a plurality of receivers connected to the second loop and interconnection means connected to the loops for interconnecting them during a portion of the time frame. In accordance with more specific aspects of the invention, the interconnecting means of the multiplex communication system includes switching means for serially connecting the first and second loops during the portion of the time frame and for maintaining the loops in substantially parallel relationship during portions of the time frame other than the portion when the loops are serially connected.

In accordance with another broad aspect of the invention, the multiplex communication system comprises a system controller; a first loop to which a plurality of transmitters are connected for carrying data between the transmitters and the system controller a second loop to which a plurality of receivers are connected for carrying data between the system controller and the receivers and a third loop including the first and second loops for carrying data between the transmitters and receivers.

In accordance with a more specific aspect of the invention switching means connected at the system controller for forming said first and second loops into a third loop are specified. Further, the switching means are more specifically defined and the transmitters and receivers are characterized as being connected in parallel with the first and second loops.

In accordance with still more specific aspects of the present application, the multiplex communication system is characterized as having means for generating time frames and includes means for generating assigned time slots and a plurality of non-assigned time slots. Also, the assigned time slots are characterized as being of the same length while the non-assigned time slots are characterized as being of a length greater than that of the assigned time slots. .

In accordance with the broadest aspect of the present invention, a method for communicating among a system controller, a plurality of remote receivers and transmitters which are connected to first and second communications loops, respectively, is disclosed comprising the steps of generating a plurality of time frames in a system controller having a plurality of assigned and non-assigned time slots. Also included is the step of communicating data and control information between the system controller and the transmitters and receivers via the assigned time slots and communicating data and control information between the transmitters and receivers via the non-assigned time slots under control of the system controller. In accordance with a more specific method, the step of communicating between the transmitters and receivers includes the step of switching the first and second loops into a single series loop. Also, the steps of communicating between the system controller and the transmitters and the receivers and communicating between the transmitters and receivers includes the further step of independently supplying timing information via a sync or timing loop to said plurality of remote receivers and transmitters.

In accordance with still more specific methods, the steps involved in switching the first and second loops into a single series loop are more specifically defined.

The method and apparatus summarized hereinabove provide a multiplex switching system which eliminates store and forward techniques and permits switching between devices with a minimum of delay. The system uses assigned time slots to carry out communications between the system controller and receivers and transmitters on either loop and uses the nonassigned slots to carry out device-to-device communications on a single loop which is a series version of two parallel loops.

It is therefore an object of the present invention to provide a multi-loop multiplex communication system and a method of operation therefor which utilizes a multi-loop arrangement to eliminate store and forward techniques.

Another object is to provide a multiplex multi-loop communication system having a plurality of transmitters and receivers connected in parallel to the loops thereof which is not subject to breakdown when a single transmitter or receiver goes out of operation.

Still another object is to provide a multiplex multi-loop communication system in which the system tradeoffs permit a system which is economically sound and realizable on an engineering level.

The foregoing and other objects and features of the present invention will be apparent from the following more particular description of preferred embodiments as illustrated in the accompanying drawings.

BRIEF DESCRIPTION OF THE DRAWINGS

FIG. 1 shows a Loop-In and a Loop-Out with a plurality of transmitters being connected to the former and a plurality of receivers being connected to the latter. A single transmitter and receiver acts as an interface with and, services a device which may be, for example, a central processing unit, a tape, a disc file or a terminal.

DESCRIPTION OF A PREFERRED EMBODIMENT

Figure 1:
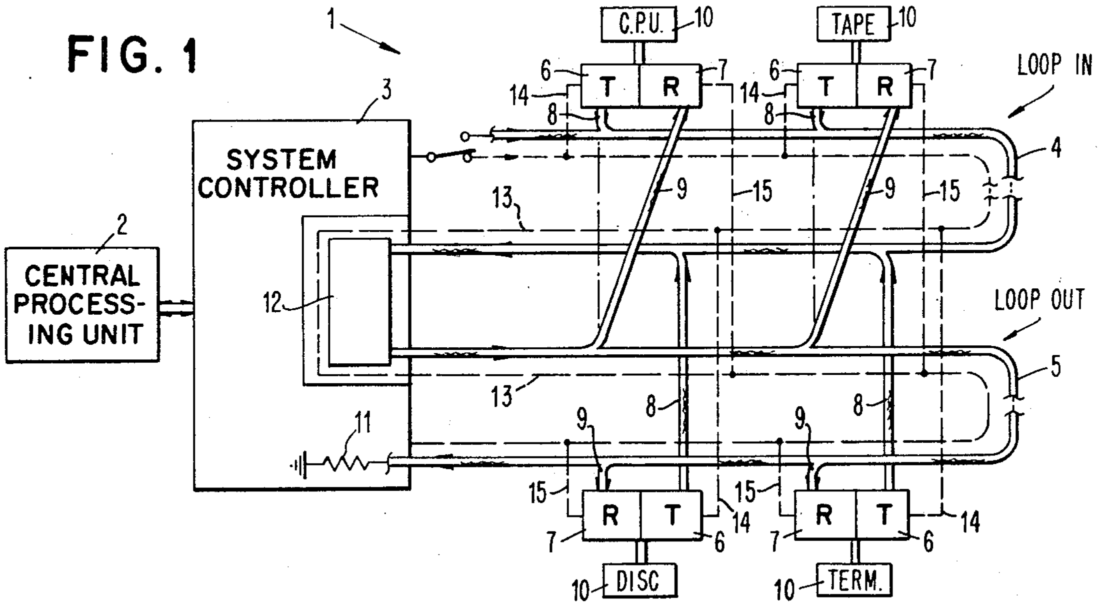
FIG. 1 is a partial schematic partial block diagram of multiplex, multi-loop system in accordance with the present invention.

Referring now to FIG. 1, there is shown therein a multi-loop, multiplex communication system 1 in accordance with the teaching of the present invention. System 1 includes a central processing unit 2 which, for purposes of the present disclosure, may be any general purpose digital computer. A system controller 3 is shown connected to unit 2 and is in turn connected to first and second loops having reference numbers 4 and 5, respectively, and further designated in FIG. 1 as Loop-In and Loop-Out, respectively. A plurality of transmitter and receiver input-output devices 6 and 7, respectively, are shown in FIG. 1 connected to loops 4 and 5, respectively. In FIG. 1, the transmitters are futher designated by the letter T while the receivers 7 are futher designated by the letter R. Transmitters 6 are connected to loop 4 via interconnections 8 and receivers 7 are shown connected to loop 5 via interconnections 9. Each of the transmitter-receiver input-output devices 6, 7 is shown connected to a device identified as block 10 in FIG. 1. Each of the blocks 10 is further identified as a CPU, tape, disc file, or terminal to indicate that any number of such devices may be interfaced with loops 4 and 5 so that devices 10 may transmit data to and receive data from loops 4 and 5 via their input-output devices 6, 7. While only four transmitters 6, receivers 7 and devices 10 combinations have been shown in FIG. 1, it should be appreciated that system 1 can handle a large number of such combinations limited only by speed, data rate, and other system considerations.

In the absence of a separate sync cable, the start of loop 4 or Loop-In may be directly connected to the system controller so that the frame and byte synchronization whereby multiplex communication is carried out may be applied to the loop. It should be noted that devices identified as transmitters 6 are connected via interconnection 8 to Loop-In or loop 4. The arrows on loop 4 and interconnections 8 indicate that information is transmitted clock-wise from each of the transmitters 6 via interconnections 8 around loop 4 to system controller 3. In a similar manner, Loop-Out or loop 5 is connected to system controller 3 and information from Loop-Out passes clock-wise to the receivers 7 via interconnections 9 as shown by the arrows thereon. Loop 5 is terminated in its characteristic impedance 11 which is shown schematically in FIG. 1 as a grounded resistor.

In FIG. 1, loops 4 and 5 are shown interconnected by a block 12 otherwise known as Compensation Delay which, as will become more apparent in the detailed description which follows, is a variable delay which may be introduced in conjunction with the propagation delay of the system to provide a fixed total increment of delay so that the time frames initially transmitted over loop 4 may be utilized on loop 5. Since the transmitters 6 and receivers 7 are connected to their respective loops 4 and 5 approximately one loop length apart, the same time frame at transmitter 6 will appear at receiver 7 approximately one loop propaga-tion time later. By recognizing the presence of this delay, the same time frames may be utilized to transmit information from system controller 3 to receiver 7 associated with loop 5. By introducing compensation delay 12 which is much larger than the loop delay, a fixed amount of delay can be provided regardless of the loop length and the synchronization and timing problems involved are reduced to a minimum. The usefulness of the delay will become more apparent when the use of assigned and nonassigned time slots in the system time frame are discussed hereinbelow. In the arrangement of FIG. 1, the loops provide bit and byte synchronization from system controller 3 to each transmitter 6 and receiver 7. As will be discussed hereinbelow, the transmitters 6 and receivers 7 are addressed sequentially and data are transmitted serially in synchronism. System controller 3 generates the system clock, does message assembling, switching and checking and interfaces with the channel.

While synchronization or timing may be applied directly to loops 4 and 5, another alternative exists. This alternative is indicated in FIG. 1 by dotted line 13 which indicates a synchronization or timing loop. If the synchronization or timing loop follows Loop-In and Loop-Out as shown by dotted line 13 in FIG. 1, no compensation delay is required since the address of the time slot which is used for communication from one transmitter to a receiver (or vice versa) is delayed by the same amount as the data. In FIG. 1, synchronization or timing loop 13 is shown connected by dotted interconnection 14 to transmitters 6 and by dotted interconnection 15 to receivers 7. In this manner, the address of the time slot is delayed by the same amount as the data.

In still another alternative arrangement, a sync cable may be disposed in parallel with the Loop-In or first loop 4 of FIG. 1. This permits bit, byte and frame synchronization and reduces the number and precision of internal oscillators at the terminals.

The tradeoff in the three alternatives indicated above is not in the switching function performed but in whether it is easier and more economical to use the additional length of sync cable with its associated hardware or to provide the compensation delay 12. Either implementation provides an efficient method of message switching.

Figure 2:
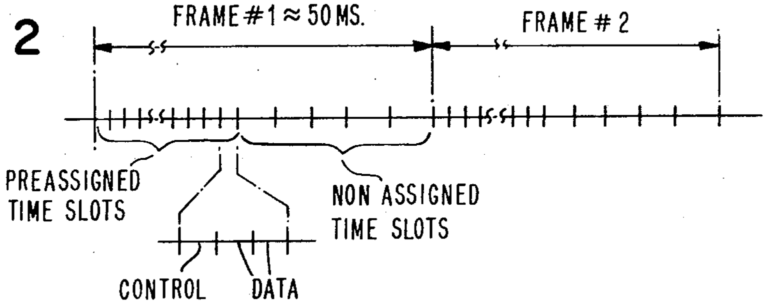
FIG. 2 shows a number of system time frames; each time frame containing a number of assigned time slots of equal length and a number of nonassigned time slots each of different length from the length of the assigned time slots.

Referring now to FIG. 2 there is shown therein a number of successive time frames showing a number of pre-assigned time slots and a number of nonassigned time slots which are different in length from the assigned time slots. The multi-loop multiplex communications system 1 shown in FIG. 1 may be regarded as a time division multiplex system in which a fixed time slot is assigned to each transmitter 6 and to each receiver 7. The assigned time slots represent only a few percent of the available bandwidth. Depending upon requirements of a particular transmitter-receiver combination, a variety of nonassigned time slots is also available. The assigned time slots are indicated in FIG. 2 by that designation while the nonassigned time slots are indicated by that designation in the same figure. In the operation of the system of FIG. 1, each transmitter 6 and each receiver 7 is addressed sequentially every time frame and thus has the same priority. The maximum duration of a time frame is determined by the rate of the low speed devices and the minimum response time needed. Bit and byte snychronization enables each transmitter 6 and receiver 7 to recognize its own time slot by counting the synchronization pulses and comparing the count with its own address count.

The order in which transmitters and receivers are addressed does not necessarily have to coincide with the physical order of devices on their associated loops. The validity of an address can be further checked by transmitting part of the receiver or transmitter address within its time slot. The address of the assigned time slot is stored in each transmitter or receiver, whereas the address of nonassigned time slots is transmitted in its pre-assigned time slot.

Figure 3:
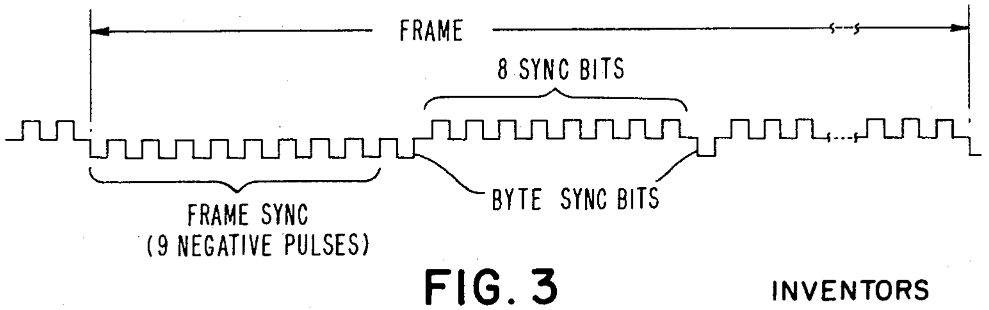
FIG. 3 shows a typical synchronization pattern for bit, byte and frame synchronization which may be utilized in the practice of the present invention.

Referring now to FIG. 3 there is shown therein a typical synchronization pattern which includes bit, byte, and frame synchronization. FIG. 3 shows a possible pattern to perform these three timing functions. Each transmitter-receiver combination has two counters: a bit counter counting the positive pulses up to 8 (or 16) and a byte counter counting the negative pulses. Besides giving the bit and byte synchronization, this method permits checking between bit and byte counts.

In FIG. 3, 8 sync bits are shown. Instead of the sync bits, a coded address may be inserted in place of these bits. This approach requires a decoder instead of a bit counter and is indicated to show the versatility of the system. The pattern of FIG. 3 is normally utilized in connection with the systems which utilize a separate sync cable. Where the timing of the system is included with the data, only frame and byte synchronization is provided and separate oscillators are required at each transmitter and receiver to provide for bit timing. Each of the timing techniques has advantages over the other, the approach ultimately chosen is generally based on system considerations and trade-offs between additional hardware and/or additional cable runs and installation costs.

Figure 4:
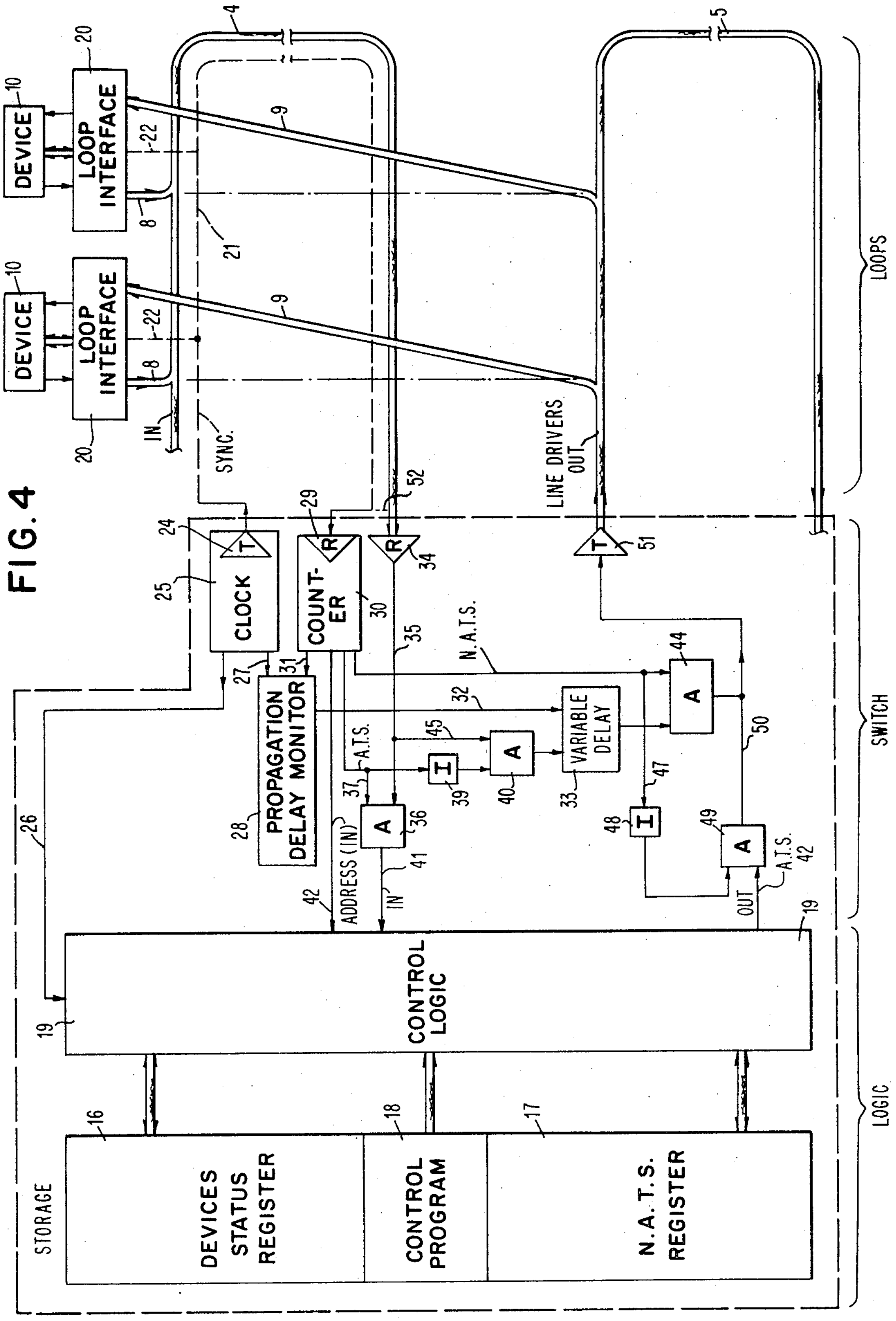
FIG. 4 is a partial schematic-partial block diagram of a system controller which may be utilized in the practice of the present invention. This figure shows a switching arrangement which may be utilized for interconnecting the loops in series during direct device-to-device communication.
Figure 5:
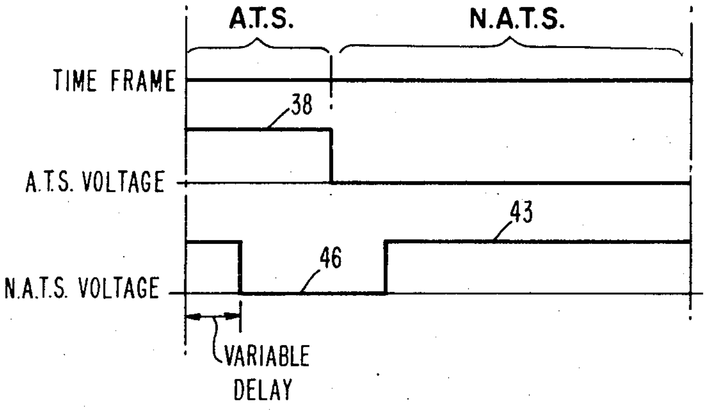
FIG. 5 shows the voltage levels utilized in FIG. 4 in switching information in a nonassigned time slot from one loop to the other.

Referring now to FIGS. 4 and 5 there is shown therein a partial schematic, partial block diagram of a system controller which may be utilized for the system controller 3 shown in FIG. 1 and, the voltage levels utilized in switching information in a nonassigned time slot from one loop to another.

Where applicable, similar devices in FIG. 4 and in FIG. 1 are identified by the same reference numbers.

It should be appreciated that although only two loop interfaces and devices are shown in FIG. 4, that in an actual system a large number of devices and interfaces are present.

In FIG. 4 system controller 3 includes logic storage and switching portions. The storage portion of system controller 3 includes a device status register identified as block 16 in FIG. 4 which keeps track of the condition or status of all devices 10 associated with loops 4 and 5. A nonassigned time slot register identified as block 18 in FIG. 4 and further identified therein as N.A.T.S. register keeps track of the use to which the non-assigned time slots of the system time frame are being put at any instant. A control program is provided in the storage portion and is identified in FIG. 4 as block 18. The control program monitors the operation of and actuates the control logic of the logic section of system controller 3. The control logic is identified as block 19 in FIG. 4 and is further identified therein by the caption Control Logic. The registers, control program and control logic have not been discussed in detail since their function and mode of operation is merely ancillary to the teaching of the present invention. Let it suffice to say that such arrangements are well known to those skilled in the data processing art and that apparatus capable of the functions associated with the storage and logic sections is commercially available.

Referring now to the switching and loop sections of FIG. 4, loop interfaces 20 are shown connected, on one hand, to loop 4 via interconnections 8 and, on the other hand, to loop 5 via interconnections 9. Loop interface 20 includes the transmitter 6 and receiver 7 of FIG. 1 and will be discussed in somewhat more detail in connection with FIG. 6 hereinbelow. Two modes of operation are possible; one where timing or synchronization is carried by loop 4 and is directly applied to the input end of loop 4, and; a second where the timing or synchronization is provided via a separate sync cable as represented in FIG. 4 by dotted line 21.

Assuming for the moment that a separate sync cable 21 is used, cable 21 is connected to a clock driver 24 which is the output device for the system clock identified as block 25 in FIG. 4 and further indicated therein by the designation Clock. Clock 25 provides timing information via lead 26 to control logic 19. Thus, system clock 25 provides timing and synchronization information to all parts of the system shown in FIG. 4. Clock 25 also provides an output via interconnection 27 to a comparator 28 also identified as Propagation Delay Monitor in FIG. 4. After propagating around sync cable 21, the output of clock driver 24 is applied to a receiver 29 associated with a counter 30 which, by counting, keeps track of the occurrence of the assigned and nonassigned time slots of FIG. 2. Counter 30 provides an output to Propagation Delay Monitor 28 via interconnection 31. When the timing of the clock output provided to Propagation Delay Monitor 28 via lead 27 differs from the output provided by counter 30 via lead 31 by more or less than the known propagation delay, an output is provided via lead 32 to augment or decrease the amount of delay provided by the Variable Delay block 33 of FIG. 4. Variable delay 33 may be a tapped delay line well known to those skilled in the communications art to which it is possible to add or subtract variable amounts of delay. Alternatively, variable delay 33 may be a plurality of shift register stages in which incoming information is stored and the output of which is controlled by appropriately timed trigger pulses. By controlling the timing of the triggering pulses, the timing of the output of the shift register stages may also be controlled.

Returning to loop 4, loop 4 is terminated at system controller 3 by an amplifier 34 which applies the control and data information on loop 4 via interconnection 35 to an AND gate 36. AND gate 36 was previously enabled via lead 37 by applying a voltage level shown at 38 in FIG. 5 from counter 30 over an interconnection labeled A.T.S. This latter designation also shown in FIG. 5 and referring to the time of occurrence of the Assigned Time Slots in the system time frame is intended to indicate in FIG. 4 that voltage level 38 of FIG. 5 is applied to AND gate 36 only during the time when assigned time slots are present.

At the same time voltage level 38 enables AND gate 36 via interconnection 37, the inverse of voltage level 38 is applied via inverter 39 to an AND gate 40. The output of inverter 39 inhibits the operation of AND gate 40 until voltage level 38 drops from its high condition. When, however, voltage level 38 is high, AND gate 36 is enabled and data and control information from receiver 34 are passed via AND gate 36 and interconnection 41 to control logic portion 19 of system controller 3.

At the same time data in the assigned time slots is provided to control logic 19, counter 30 provides address information via lead 42 which is further identified in FIG. 4 as Address (IN). Once the address information and data enters control logic 19, the internal circuitry of control logic 19 operates on the information provided and, provides, in the assigned time slots, control and data information for those portions of loop interfaces 20 associated with loop 5. Thus, information in the assigned time slots appears at output lead 42 of control logic 19 and is otherwise identified in FIG. 4 by the designation A.T.S. OUT.

Returning now to counter 30, an output level shown in FIG. 5 as voltage level 43 is applied to an AND gate 44 via an interconnection labeled N.A.T.S. in FIG. 4. This designation is intended to show that voltage level 43 is applied to AND gate 44 during that portion of the system time frame when the nonassigned time slots are present. As indicated in FIG. 5, the onset of voltage level 43 on interconnection N.A.T.S. is delayed by an amount indicated in FIG. 5 as Variable Delay to permit information in delay device 33 to arrive at AND gate 44 at the same time AND gate 44 is enabled via interconnection N.A.T.S. Variable delay device 33 passes no information during the assigned time slot portion of the system time frame; it is simply emptied at the beginning of the A.T.S. cycle. This results from the fact that when voltage level 38 is applied via interconnection A.T.S. to inverter 39, the output of inverter 39 inhibits gate 40. As a result, information on lead 35 which is coupled to AND gate 40 via interconnection 45 cannot pass through AND gate 40. However, when voltage level 38 falls, inverter 39 applies an enabling signal to AND gate 40 and signals on interconnection 35 are passed via interconnection 45 and enabled AND gate 40 to variable delay device 33. At this point, data in the nonassigned time slots is delayed by the amount of delay provided, at that time, by variable delay device 33. The output of variable delay device 33 is provided to AND gate 44 which is enabled via interconnection N.A.T.S. by the delayed voltage level 43 from counter 30. The variable delay of device 33 and the Variable Delay indicated in FIG. 5 should be both the same so that AND gate 44 is enabled at the same time the nonassigned time slots which have been delayed in variable delay 33 appear as the other input of AND gate 44.

Prior to the arrival of the nonassigned time slots with whatever information they hold at AND gate 44 and prior to enabling signal 43 being applied via interconnection N.A.T.S. to AND gate 44, the voltage level 46 shown in FIG. 5 is present on interconnection N.A.T.S. This voltage level is applied via interconnection 47 to an inverter 48 producing at the output thereof a voltage level of the character of voltage level 38. This voltage level enables AND gate 49 so that when assigned time slots and their associated information appear on lead 42, AND gate 49 passes these signals via interconnection 50 to a line driver 51. Whatever information is in the assigned time slots is passed along loop 5 and at the appropriate moment, a loop interface associated with a given assigned time slot removes information from loop 5 and passes it to its associated device 10. At the time AND gate 44 is enabled, AND gate 49 is inhibited by the output of inverter 48. At the same time, data in the nonassigned time slots passes through enabled AND gate 44 to interconnection 50 and from thence to line driver 51 and loop OUT 5. In the usual case, loop interfaces 20 have already been apprised of the nonassigned time slot from which they will receive data. As such, when the nonassigned time slot which has been addressed to a particular loop interface 20 arrives at that interface, the data is removed and passed to its associated device which may be another central processing unit, disc file, terminal or the like.

From the foregoing, it should be clear that communications between system controller 3 and devices 10 on loop IN and loop OUT are carried out via assigned time slots. It should also be clear that direct communications between loop interfaces 20 on loops 4 and 5 are carried out in nonassigned time slots under control of system controller 3. In the latter instance, loops 4 and 5 which are effectively in parallel during the assigned time slot portion of the system time frame are switched into a series configuration during the nonassigned time slot portion of the system time frame.

In the instance where a separate sync cable 21 is not utilized, the clock driver 24 is directly connected to loop 4. As indicated previously, under such circumstances, only byte and frame synchronization is provided. The only other change required in the arrangement of FIG. 4 is to interconnect loop 4 with the input amplifier 29 of counter 30 via an interconnection 52. With these changes, communications between transmitters 6 and system controller 3 and receivers 7 and system controller 3 are carried out via the assigned time slots and, communications between transmitters 6 and receivers 7 are carried out via nonassigned time slots under control of system controller 3 in the same manner as described hereinabove in connection with the embodiment which incorporates sync cable 21.

Where a sync cable is supplied for both loops 4 and 5, in the manner shown in FIG. 1, bit, byte and frame synchronization can be supplied and the requirements for variable delay 33 are eliminated since the data and synchronization information are both delayed by the same amounts as represented by the propagation delay around the loops. In this embodiment, the assigned time slots are used for communication between transmitters 6 and receivers 7 and system controller 3 and direct device-to-device communication is carried out in the nonassigned time slots under control of system controller 3. The arrangement of FIG. 4 can be simply modified to eliminate variable delay 33. Also, Propagation Delay Monitor 28 is no longer required. By connecting the output of AND gate 40 directly to the input of AND gate 44, the system operates in the same manner as described in connection with the system which utilized sync cable 21. The only difference is that there is no delay present other than the propagation delay and, in many instances, information which could have been placed in an emptied assigned time slot when the variable delay 33 was present cannot be accomplished in the absence of delay 33 and, the next time frame is utilized instead.

Figure 6:
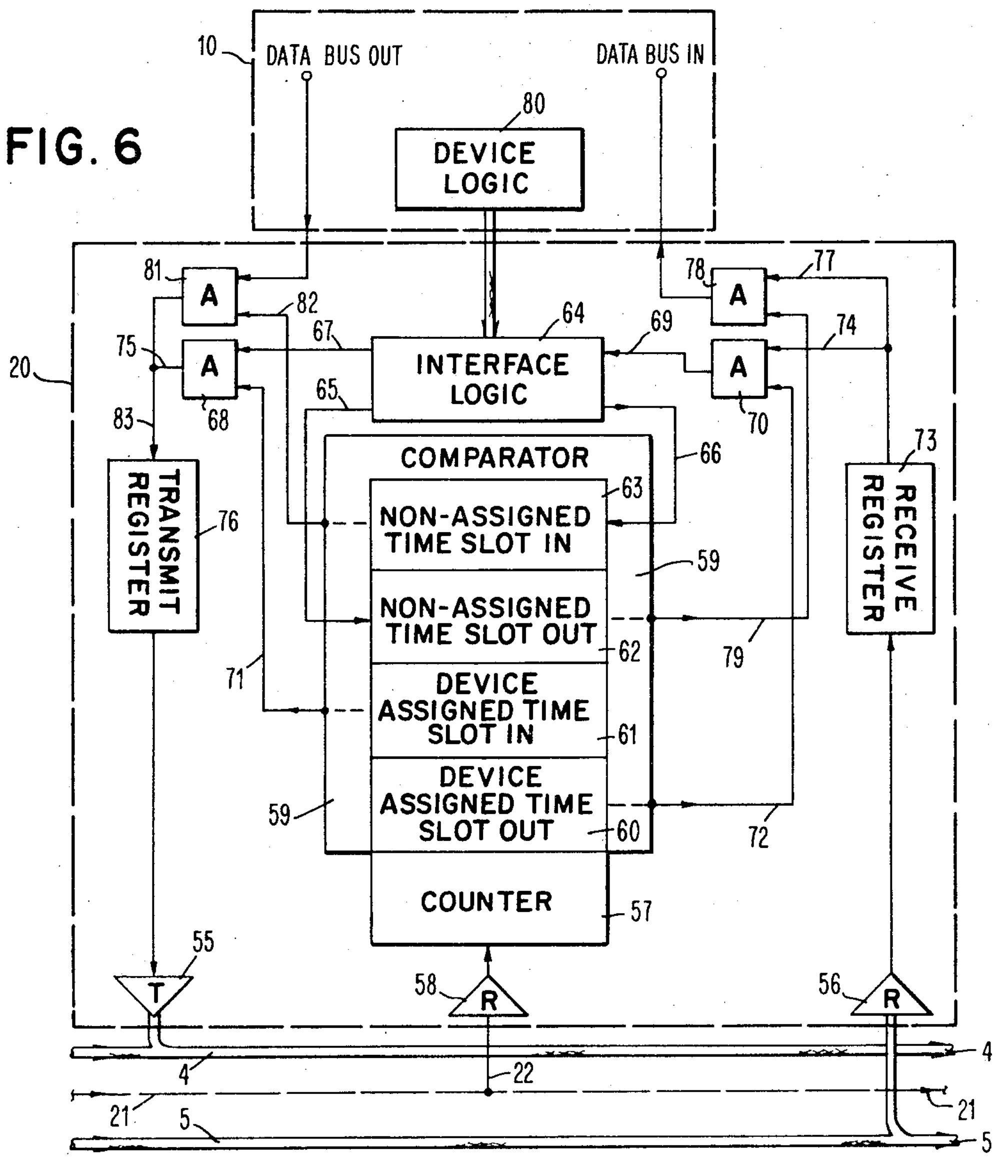
FIG. 6 is a partial schematic-partial block diagram of a typical loop interface which may be utilized in connecting the transmitters and receivers of FIG. 1 to their respective loops. A typical connection between the loop interface and a device such as a central processing unit or a disc file is also shown in block form.

Referring now to FIG. 6, there is shown therein a partial schematic-partial block diagram of a loop interface 20 and device 10 suitable for use in the arrangement of FIG. 4. Device 20 consists of a transmitter portion and a receiver portion which are connected to IN loop 4 and OUT loop 5, respectively, via a transmit driver 55 and a receive amplifier 56, respectively. Sync cable 21 is shown connected to a counter 57 via a sync receiver 58. Counter 57 of FIG. 6 is similar to counter 30 of FIG. 4 and may be any one of a number of commercially available counting circuits utilized for the purpose of counting timing pulses. Counter 57 provides its output to a comparator circuit 59, which contains a plurality of registers which contain addresses of assigned or nonassigned time slots. These addresses are continually compared in comparator 59 and, when a match between the incoming count and a register address is obtained, an output signal is provided at that time. In FIG. 6, register 60 stores the address of the device Assigned Time Slot Out; register 61 stores the address of the device Assigned Time Slot In; register 62 stores the address of Nonassigned Time Slot Out; and, register 63 stores the address of a Nonassigned Time Slot In. Loop interface 20 also contains Interface Logic represented by block 64 in FIG. 6. Interface logic block 64 is connected via interconnection 65 to register 62 and via interconnection 66 to register 63. Interface logic 64 is also connected via interconnection 67 to an AND gate 68 and via interconnection 69 to an AND gate 70. A second input to AND gate 68 is obtained via interconnection 71 from register 61. One of the inputs to AND gate 70 is derived from register 60 via interconnection 72. The second input to AND gate 70 is derived from Receive Register 73 via interconnection 74. The output of AND gate 68 is connected via interconnection 75 to Transmit Register 76. Receive register 73 is also connected via interconnection 77 to Data Bus AND gate 78 and register 62 provides a second input to AND gate 78 via interconnection 79. As will be shown hereinafter, information is fed to device 10 via the interconnection labelled Data Bus In under control of device logic 80 which controls the functioning of the device logic circuitry; indicating where to store a read-out of information, for example. Data is fed from device 10 via an interconnection labelled Data Bus Out which is one of the inputs to data bus AND gate 81. The second input to AND gate 81 is derived from register 63 via interconnection 82. The output of AND gate 41 is applied to transmit register 76 via interconnection 83 and is ultimately applied via transmit driver 55 to In loop 4.

Referring to FIG. 6, when a device 10 has data to transmit to another device 10 via its loop interface 20, the following sequence of events occurs. Device logic 80 interacts with interface logic 64 and sets up a request via interconnection 67 to AND gate 68 which asks system controller 3 for a nonassigned time slot in which to transmit its data. In the meantime, counter 57 and comparator 59 determine the arrival of the device assigned time slots and register 61 provides an output via interconnection 71 to AND gate 68 when the Device Assigned Time Slot In becomes available. The request for a nonassigned time slot passes via interconnection 75 to transmit register 76 and ultimately passes via interface driver 55 and In loop 4 to system controller 3. System controller 3, in conjunction with its control logic 19 determines the availability of a nonassigned time slot and places this information in the assigned time slot of the requesting device. This information is applied to Out loop 5 and is applied via receive amplifier 56 to receive register 73. When counter 57 and comparator 59 indicate the presence of the Device Assigned Time Slot Out, register 60 applies a signal to AND gate 70 via interconnection 72, which, in conjunction with the information on interconnection 74, actuates AND gate 70. The output of AND gate 70 is applied to interface logic 64 via interconnection 69. Interface logic 64 then applies the information received on the Device Assigned Time Slot Out to register 63 via interconnection 66 storing therein the address of the nonassigned Time Slot In in which device 10 is to transmit its data.

At this point, loop interface 20 is prepared to transmit data via a nonassigned time slot to another device 10. At this point, it should be appreciated that the device 10 to which information is to be transmitted, has been advised by system controller 3 via its Assigned Time Slot Out that it is to receive data from the transmitting device in the same Nonassigned Time Slot in which data is being transmitted and, this information is stored in the Nonassigned Time Slot Out register 62 of its loop interface 20. Returning now to the device 10 which is to transmit data, when counter 57 and comparator 59 indicate that Nonassigned Time Slot In has been reached, register 63 provides an output via interconnection 82 to AND gate 81. This output, in conjunction with the data which is present on Data Bus Out feeds the data via interconnection 83 to transmit register 76 which in turn feeds the data to In loop 4 via transmit driver 55. The data is then sent via a nonassigned time slot to system controller 3 where loops 4 and 5 are switched into a series configuration and the data passes along loop portion 5 to the loop interface 20 associated with device 10 which is to receive the data. Again referring to FIG. 6, when counter 57 and comparator 59 indicate that the address of the Nonassigned Time Slot Out has been reached, register 62 applies a signal via interconnection 79 to data bus AND gate 78. This enabling signal in conjunction with the data which has been passed to data bus AND gate 78 from receive register 73 via interconnection 77 causes AND gate 78 to provide the data to device 10 via Data Bus In.

While a device 10 is transmitting in a nonassigned time slot and while another device 10 is receiving in the same nonassigned time slot, it should be appreciated that the latter device 10 can also be transmitting to the former device 10 in a different nonassigned time slot. In other words, full duplex operation can be achieved.

From the foregoing, it should be clear that communications between device 10 and system controller 3 and vice versa are handled via Device Assigned Time Slots In and Out and that direct device-to-device communications are carried out via Nonassigned Time Slots In and Out. It should also be clear that during device 10-system controller 3 communications that loops 4 and 5 are in parallel relationship with one another and that during device 10-to-device 10 communication, loops 4 and 5 are in series forming a third loop of which loops 4 and 5 are first and second portions.

In the foregoing discussion of FIGS. 4, 5 and 6, it has been noted that transmitters 6 have been associated with loop 4 and that receivers 7 have been associated with loop 5. It should be appreciated that transmitters 6 are more properly defined as tranceivers since they must incorporate some receiving means whereby address and timing information are provided to the transmitter. In this manner, the transmitter can function in synchronism with the system time frame.

In the foregoing discussion, AND gates, registers, drivers, amplifiers, counters and comparators have been generally indicated in describing the operation of the system of this invention. Since these devices per se form no part of the present invention, they have not been described in detail. However, the aforementioned devices are standard and well known to those skilled in the communications art; and, in many cases, commercially available off-the-shelf devices can be utilized.

Figure 7:
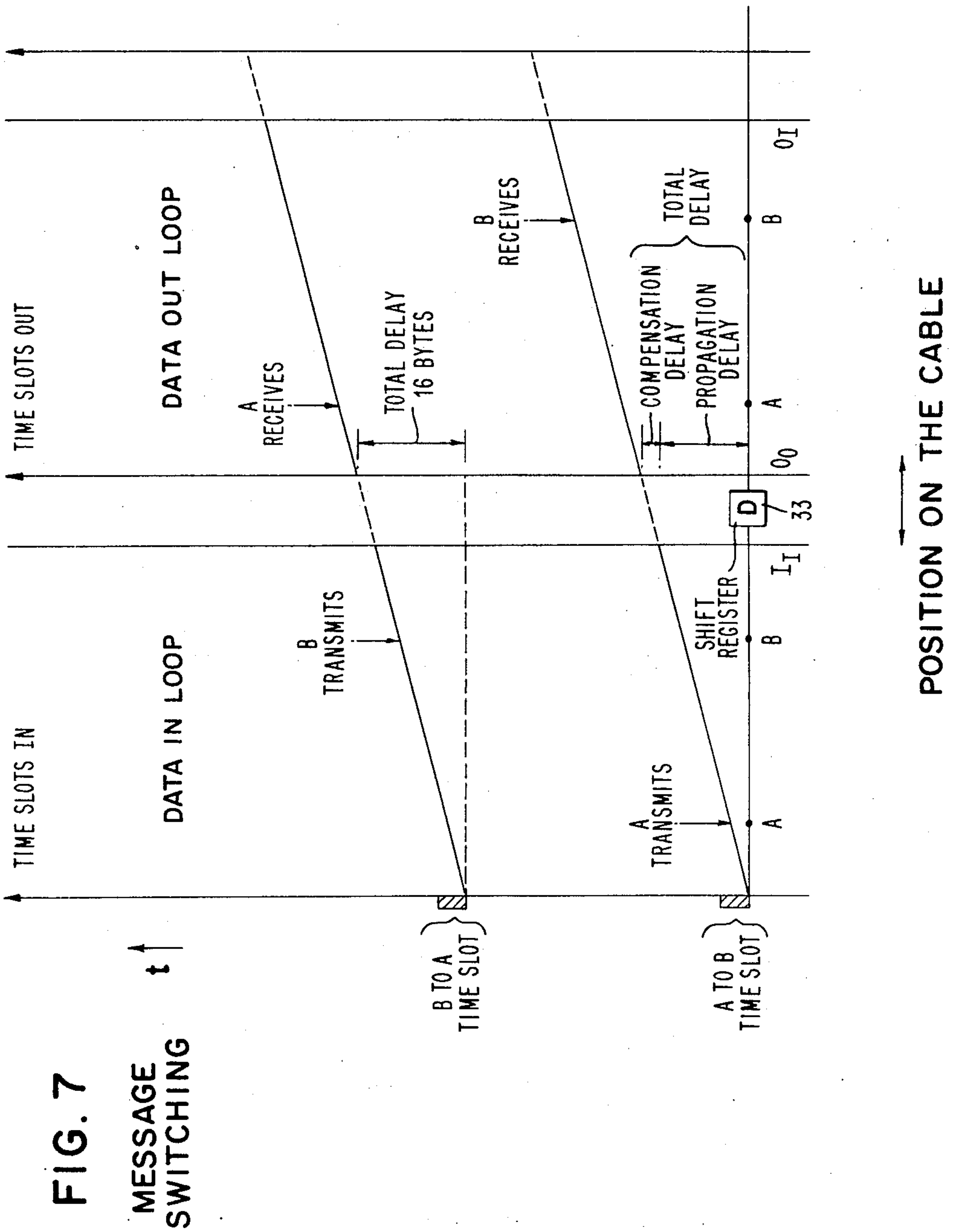
FIG. 7 shows the timing diagram for the transmission of messages between a transmitter on the In-Loop and a receiver on the Out-Loop.

In connection with the switching of messages between two devices 10, a timing diagram for the transmission from a device A to a device B is shown in FIG. 7. The horizontal axis corresponds to the position of the devices 10 along the In and Out cables which correspond to loops 4 and 5, respectively. Loops 4 and 5, during switching, are connected in series to a variable or compensation delay device 33 which keeps the total delay between $I_0$ and $O_0$fixed. In a typical system, a total delay of 16 bytes should always be larger than loop propagation delay (10 microseconds or 12 bytes at 10Mb-s for a 10,000 foot loop). The actual loop delay can be determined very accurately in system controller 3 by obtaining the difference between the ingoing and outgoing synchronization pulse count. In FIG. 7, the vertical axis corresponds to time. FIG. 7 allows one to locate the position of the time slots around the serially connected loops.

In loop In 4 and loop Out 5, the preassigned time slots coincide and, therefore, have the same physical address. However, the addresses of all the nonassigned time slots on Out loop 5 have been systematically incremented by an amount equal to the total delay (e.g., 16 bytes) to permit message switching by multiplexing. It should be noted that failure of the variable delay device 33 only affects the device-to-device message switching ability of the system.

The procedure outlined hereinabove and indicated diagramatically in FIG. 7 for message switching, completely dissengages the central processing units associated with the system controller from the data transfer and minimizes the handling of data by the system controller.

For voice switching applications, telephone sets are directly connected to the loops 4 and 5, which may be considered as the highway of a time division multiplexer. Physically, the voice loop may be the data cables themselves, or another pair of cables (IN and OUT) running parallel with the data cables and having the same transmission characteristics.

Interconnecting two subscribers is accomplished by assigning them a pair (one for each direction) of nonassigned time slots regularly spaced (each 125 $\mu$sec. = 8 kHz) in the system time frame (via the assigned time slots).

The two modes of pulse multiplexing should be considered on the highway: P.C.M. (or ΔP.C.M.) and P.A.M. Both approaches are compatible with the present system. With PCM (ΔPCM), each telephone set would contain an analog-to-digital and a digital-to-analog converter.

Since a pair of free time slots can always be allocated to any two free subscribers, the system is nonblocking. Assuming 2000 subscribers and a maximum traffic for the average busy hour of 0.18 Erlang, 360 pairs of time slots would be enough to assure this traffic. With a seven-level PCM (T1 compatible), the necessary bandwidth is 23 Mb/sec on each cable. If the actual bit rate on each cable is 100 Mb/sec, a full duplex 77 Mb/sec channel is still available for data transmission.

A lower-cost solution would be to use P.A.M. with resonant transfer between telephone sets. In that case, a separate pair of cables is needed because analog signals are transmitted and thus, amplifiers have to be used around the loop instead of digital repeaters. The telephone would still have to be connected to the data loop for time slot assignments. Furthermore, the possibility of using resonant transfer from one telephone set to the other across the loop should be proved.

A common problem to both approaches is that of ringing. A twisted pair, carrying the ringing signal, running parallel to the loop can be used. Ringing of a given subscriber can be done by transmitting on the data line a signal which connects the set bell to the ringing cable. This ringing cable could also be the d.c. power line for the entire system.

While the above has been described in connection with voice signals, it should be appreciated that any analog signal, for example, video, can be handled using the above described techniques.

We claim:

1. A multiplex communication system comprising:
- a system controller including means for generating time frames,
- at least first and second communications loops,
- a plurality of loop interface devices including a transmitter and a receiver connected in parallel with said first and second loops, respectively, and,
- means connected to said loops for interconnecting said loops during a portion of said time frames.

2. A multiplex communication system according to claim 1 wherein said means for interconnecting said loops includes:
- switching means for serially connecting said first and second loops during said portion of said time frame and for maintaining said loops in substantially parallel relationship during portions other than said portion of said time frame.

3. A multiplex communication system according to claim 1 wherein said means for generating time frames is connected directly to said first loop.

4. A multiplex communication system according to claim 1 further including a separate sync loop connected in parallel with at least said first loop to which said means for generating time frames is connected.

5. A multiplex communication system according to claim 1 further including a data handling device connected to each of said loop interface devices.

6. A multiplex communication system according to claim 4 wherein said sync loop is connected in parallel with said loop interface devices.

7. A multiplex communication system comprising:
- a system controller including means for generating time frames,
- at least first and second communication loops,
- a plurality of transceivers connected in parallel with said first loop,
- a plurality of receivers connected in parallel with said second loop, and,
- means connected to said loops for interconnecting said loops during a portion of said time frame.

8. A multiplex communication system according to claim 7 wherein said means for generating time frames includes means for generating assigned time slots one per tranceiver and a plurality of non-assigned time slots.

9. A multiplex communication system according to claim 7 wherein said means for interconnecting said loops during a portion of said time frame includes:
- switching means for serially connecting said first and second loops during said portion of said time frame and for maintaining said loops in substantially parallel relationship during portions other than said portion of said time frame.

10. A multiplex communication system according to claim 7 wherein said means for generating time frames is connected directly to said first loop.

11. A multiplex communication system according to claim 7 further including a separate sync loop connected in parallel with at least said first loop to which said means for generating time frames is connected.

12. A multiplex communication system according to claim 7 further including a separate sync loop connected in parallel with said first and second loops to which said means for generating time frames is connected.

13. A multiplex communication system according to claim 7 further including a data handling device connected to each said tranceiver and each said receiver.

14. A multiplex communication system according to claim 8 wherein said assigned time slots are the same length and said non-assigned time slots are of a length equal to or greater than said assigned time slots.

15. A multiplex communication system according to claim 9 further including delay means electrically interconnected with said switching means, the amount of delay provided plus the propagation delay in said first loop being a constant value.

16. A multiplex communication system according to claim 11 wherein said sync loop is connected in parallel with said tranceivers and said receivers.

17. A multiplex communication system according to claim 12 wherein said sync loop is connected in parallel with said tranceivers and said receivers.

18. A multiplex communication system according to claim 13 wherein said data handling device is one of a central processing unit, a data storage device and a data terminal.

19. A multiplex communication system comprising:
a system controller,
a first loop to which a plurality of transmitters is connected for carrying information between said transmitters and said system controller,
a second loop to which a plurality of receivers is connected for carrying information between said system controller and said receivers and,
a third loop including said first and second loops for carrying information between said transmitters and said receivers.

20. A multiplex communication system according to claim 19 further including switching means for serially interconnecting said first and second loops to form said third loop when information is being directly passed from a transmitter to a receiver and vice versa.

21. A multiplex communication system according to claim 19 further including means for generating time frames connected to said loops.

22. A multiplex communication system according to claim 19 further including a data handling device connected to a receiver and a transmitter.

23. A multiplex communication system according to claim 19 further including means for generating time frames connected directly to said first loop.

24. A multiplex communication system according to claim 19 further including a separate sync loop connected in parallel with said at least said first loop.

25. A method for communicating among a system controller and a plurality of remote transmitters and receivers which are connected to first and second communications loops, respectively, comprising the steps of:
generating a plurality of time frames in said system controller having a plurality of assigned and nonassigned time slots,
communicating information between said system controller and said transmitters and receivers via said assigned time slots, and,
communicating information between said transmitters and said receivers via non-assigned time slots.

26. A method for communicating according to claim 25 wherein the step of communicating between said transmitters and said receivers includes the step of:
switching said first and second loops into a single series loop.

27. A method for communicating according to claim 25 further including the step of:
independently supplying timing information via a sync loop to said plurality of remote receivers and transmitters.

28. A method for communicating according to claim 25 further including the step of:
applying timing information directly to said first loop.

29. A method for communicating according to claim 25 further including the step of:
electrically connecting a data handling device to a transmitter and a receiver.

30. A method for communicating according to claim 26 further including the step of:
introducing a delay between said first and second loops to delay the appearance of said assigned and nonassigned time slots on said second loop by a fixed amount.

* * * * *